(12) United States Patent
Everhart (10) Patent No.: US 11,459,179 B2
(45) Date of Patent: Oct. 4, 2022

(54) VERTICAL DOUGH CONVEYOR

(71) Applicant: ILLINOIS TOOL WORKS INC., Glenview, IL (US)

(72) Inventor: Joel J. Everhart, Tipp City, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/359,773

(22) Filed: Jun. 28, 2021

(65) Prior Publication Data

US 2021/0403242 A1 Dec. 30, 2021

Related U.S. Application Data

(60) Provisional application No. 63/045,913, filed on Jun. 30, 2020.

(51) Int. Cl.
| | |
|---|---|
| *B65G 15/14* | (2006.01) |
| *B65G 15/10* | (2006.01) |
| *A21C 9/08* | (2006.01) |
| *B65G 21/12* | (2006.01) |
| *B65G 37/00* | (2006.01) |

(52) U.S. Cl.
CPC ............. *B65G 21/12* (2013.01); *A21C 9/08* (2013.01); *B65G 37/005* (2013.01); *B65G 2201/0202* (2013.01); *B65G 2207/08* (2013.01); *B65G 2207/14* (2013.01); *B65G 2207/26* (2013.01)

(58) Field of Classification Search
CPC ........ B65G 15/10; B65G 15/14; B65G 21/12; B65G 37/005; A21C 9/08

USPC .... 198/604, 605, 607, 626.3, 782, 817, 819, 198/861.1, 861.6
See application file for complete search history.

(56) References Cited

U.S. PATENT DOCUMENTS

| | | | | |
|---|---|---|---|---|
| 3,857,475 A | * | 12/1974 | Smith | B26D 7/0625 198/626.5 |
| 4,457,422 A | * | 7/1984 | Hurd | B65G 15/14 198/607 |
| 5,200,203 A | * | 4/1993 | Hayashi | A21C 3/04 83/365 |
| 5,314,322 A | * | 5/1994 | Morikawa | A21C 3/02 425/297 |

(Continued)

OTHER PUBLICATIONS

Admitted Prior Art, Images of FME Vertical Dough Conveyor, 2 pages.
AMF Dough Conveyors, booklet, Oct. 2005, 4 pages.

*Primary Examiner* — Douglas A Hess
(74) *Attorney, Agent, or Firm* — Thompson Hine LLP (57) ABSTRACT

A vertical dough conveyor includes a base frame, and a vertical conveyor assembly pivotably connected to the base frame for pivoting movement between a use position and an access position. The vertical conveyor assembly includes a first conveyor belt unit and a second conveyor belt unit, wherein the second conveyor belt unit is pivotably connected to the first conveyor unit such that, when the vertical conveyor assembly is in the access position, the first conveyor belt unit is pivotably movable between a first position and a second position. In the first position, a belt of the second conveyor belt unit is positioned in opposed relation to a belt of the first conveyor belt unit to define a dough feed gap therebetween. In the second position, the belt of second conveyor belt unit is pivoted away from the belt of the first conveyor belt unit.

14 Claims, 9 Drawing Sheets

(56) References Cited

U.S. PATENT DOCUMENTS

| | | | | |
|---|---|---|---|---|
| 5,435,433 A * | 7/1995 | Jordan | ................... | B65G 15/14 |
| | | | | 198/626.5 |
| 5,590,588 A * | 1/1997 | Tomimatsu | ........... | G07F 13/025 |
| | | | | 222/281 |
| 5,596,865 A * | 1/1997 | Kramer | .................... | A61J 3/10 |
| | | | | 53/111 R |
| 5,924,551 A * | 7/1999 | Radmall | ................ | B65G 15/14 |
| | | | | 198/861.5 |
| 5,950,804 A * | 9/1999 | Farkas | ................ | B65G 19/025 |
| | | | | 198/626.1 |
| 6,543,622 B1 * | 4/2003 | Fridman | ................ | B65G 21/10 |
| | | | | 209/420 |
| 9,187,258 B2 * | 11/2015 | Zhang | ................... | B65G 37/005 |
| 9,359,148 B2 * | 6/2016 | Arevalo | ................ | G01N 33/10 |

* cited by examiner

VERTICAL DOUGH CONVEYOR

TECHNICAL FIELD

This application relates generally to vertical conveyors for food products such as dough and, more specifically, to a vertical dough conveyor adapted for cleaning and maintenance.

BACKGROUND

Vertical dough conveyors are commonly used in food production for carrying dough upward for loading into a large mixer or other food handling device used in the production of bakery products. The vertical conveyor includes two belts spaced from each other to define a gap between the belts, where the gap runs upward. Dough is held between the belts as the dough is carried upward along the gap by driving the belts. Cleanability of such vertical conveyors is a critical consideration.

It would be desirable to provide an improved vertical dough conveyor adapted for cleaning and maintenance.

SUMMARY

In one aspect, a vertical dough conveyor includes a base frame, and a vertical conveyor assembly pivotably connected to the base frame for pivoting movement between a use position and an access position. The vertical conveyor assembly includes a first conveyor belt unit and a second conveyor belt unit, wherein the second conveyor belt unit is pivotably connected to the first conveyor unit such that, when the vertical conveyor assembly is in the access position, the first conveyor belt unit is pivotably movable between a first position and a second position. In the first position, a belt of the second conveyor belt unit is positioned in opposed relation to a belt of the first conveyor belt unit to define a dough feed gap therebetween. In the second position, the belt of second conveyor belt unit is pivoted away from the belt of the first conveyor belt unit.

In another aspect, a substantially vertical dough conveyor includes a substantially vertical gap conveyor assembly having a conveying gap with a lower infeed end and an upper outfeed end, and a feed conveyor for feeding dough to the lower infeed end. The substantially vertical gap conveyor assembly is mounted for movement between a use position relative to the feed conveyor and an access position relative to the feed conveyor. The substantially vertical gap conveyor assembly includes a first portion at one side of the conveying gap and a second portion at an opposite side of the conveying gap, wherein the second portion is mounted for movement between a use position relative to the first portion and a cleaning/maintenance position relative to the first portion. In the use position of the second portion, the second portion, together with the first portion, defines the conveying gap. In the cleaning/maintenance position of the second portion, the second portion is moved to a position that opens at least one side of the conveying gap.

The details of one or more embodiments are set forth in the accompanying drawings and the description below. Other features, objects, and advantages will be apparent from the description and drawings, and from the claims.

DETAILED DESCRIPTION

Figure 1A:
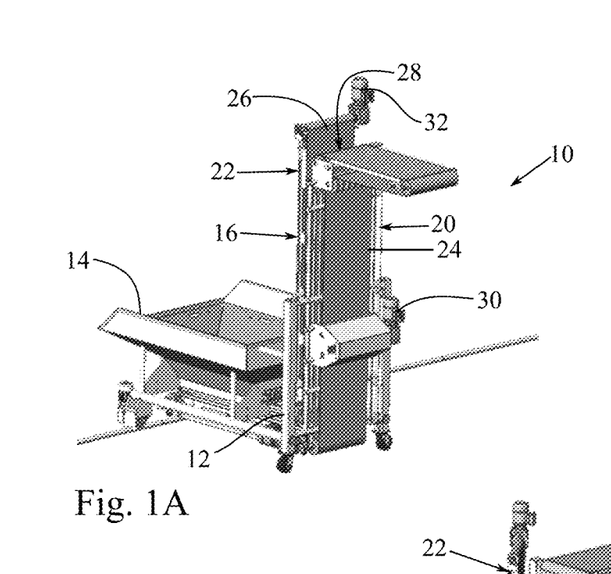
FIGS. 1A-1C show a vertical conveyor 10 in different positions.
Figure 1B:
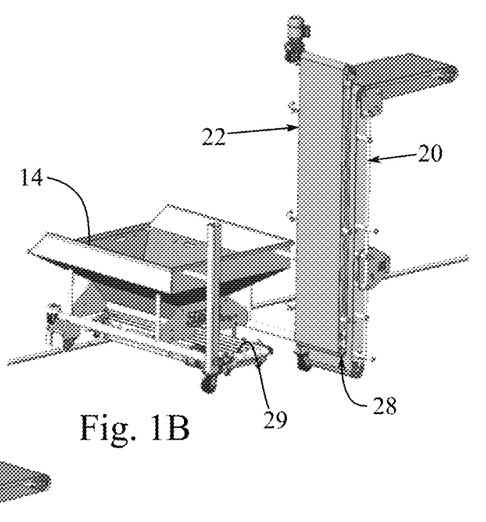

Referring to FIG. 1, a vertical dough conveyor 10 includes a base frame 12 that supports a dough hopper 14, and a vertical conveyor assembly 16 pivotably connected to the base frame 12 for pivoting movement between a use position (FIG. 1A) and an access position (FIG. 1B). The vertical conveyor assembly includes a conveyor belt unit 20 and a conveyor belt unit 22. In the use position, the belts 24 and 26 of the two units are positioned in opposed relation to each other to define a dough feed gap 28 therebetween. When the vertical conveyor assembly is in the use position, dough can be fed along a horizontal conveyor 29 below the dough hopper 14 and toward and into the gap 28 for feeding upward along the gap 28 by operation of the belts 24 and 26. The bottom of the conveyor belt unit 22 is higher than the bottom of the conveyor belt unit 20 to enable the dough infeed into the gap. Each conveyor belt unit 20, 22 includes a respective frame 34, 36 on which the belt systems are mounted, and a respective drive motor 30, 32 for belt operation.

Figure 1C:
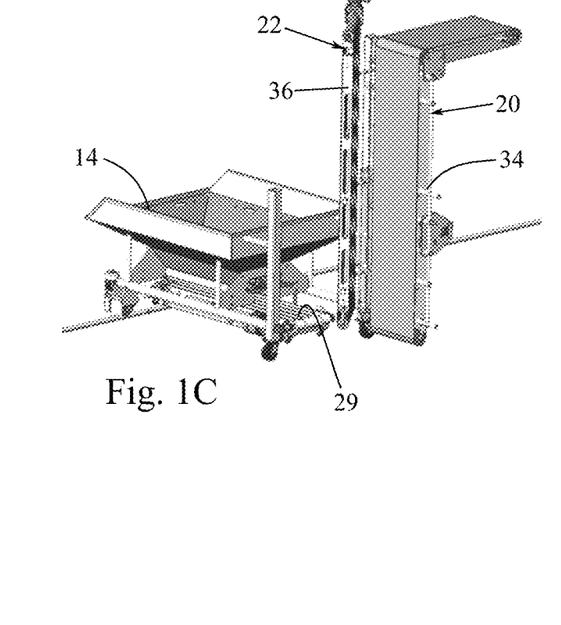

As per FIG. 1C, the conveyor belt unit 22 is pivotably connected to the conveyor belt unit 20 such that, when one side of the vertical conveyor assembly is pivoted away from the base frame into the access position, the conveyor belt unit 22 is pivotably movable between its use position (per FIG. 1B) opposed to the conveyor belt unit 20, and a cleaning/maintenance position (per FIG. 1C). In the cleaning/maintenance position, the belt 26 of the conveyor belt unit 22 is pivoted away from the belt 24 of the conveyor belt unit 20. This position provides for easy cleaning of the feed area gap of the conveyor assembly, including the surfaces of the belts 24 and 26, as well as portions of the frames 34, 36. Notably, with the conveyor belt unit 22 in the cleaning/maintenance position, the conveyor belt unit 22 has a free end and the belt 26 can be easily removed via the free end for maintenance or replacement.

Figure 2A:
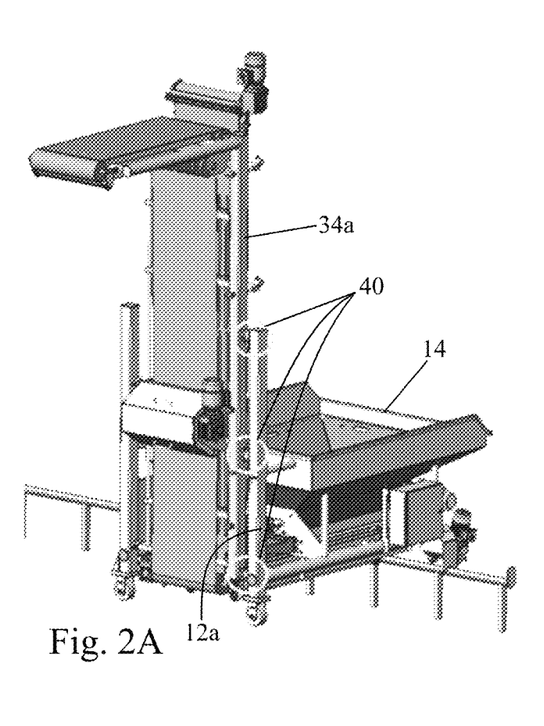
FIGS. 2A-2C show pivot connections between the base frame and the vertical conveyor assembly.
Figures 2B, 2C:
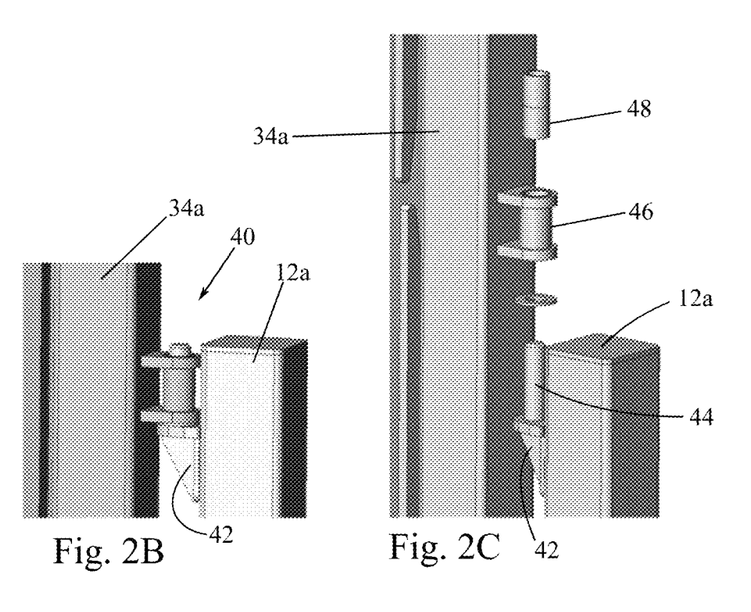

Referring to FIGS. 2A-2C, the pivot connection between the base frame 12 and the vertical conveyor assembly 16 is shown. Here, three pivot connections 40 are provided between the upright frame member 12a of the base frame and the upright frame member 34a of the conveyor belt unit 20. In the case of each pivot connection 40, the frame member 12a carries a bracket 42 that supports an upright pivot pin 44 and the frame member 34a carries a pivot barrel 46 into which a bushing 48 is inserted to facilitate the rotation of barrel 46 about the pin 44. However, other styles of pivot connections could be implemented.

Figures 3A, 3B, 3C:
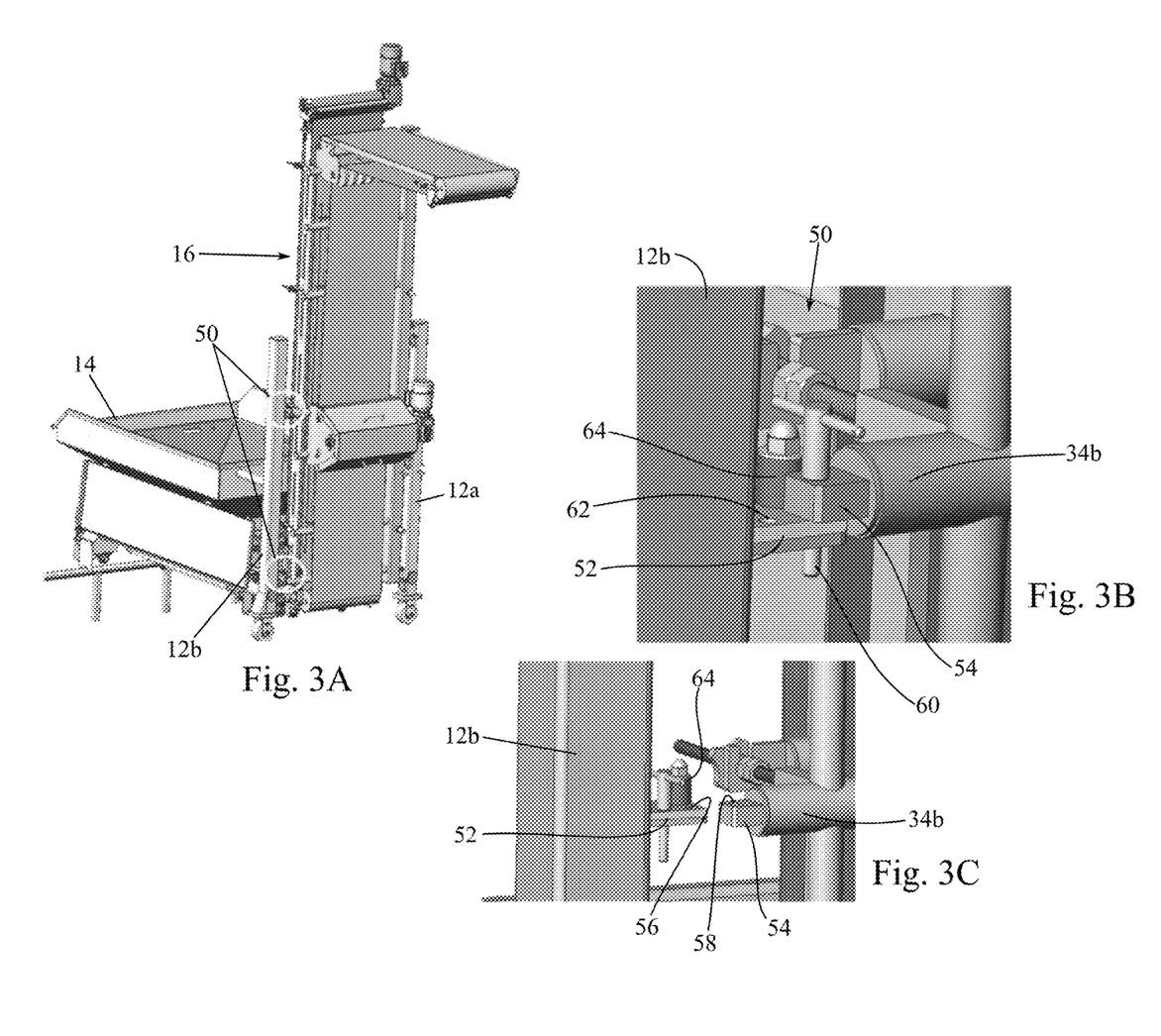
FIGS. 3A-3C show latching assemblies between the base frame and the vertical conveyor assembly for releasably retaining the vertical conveyor assembly in its use position.
Figure 4A:
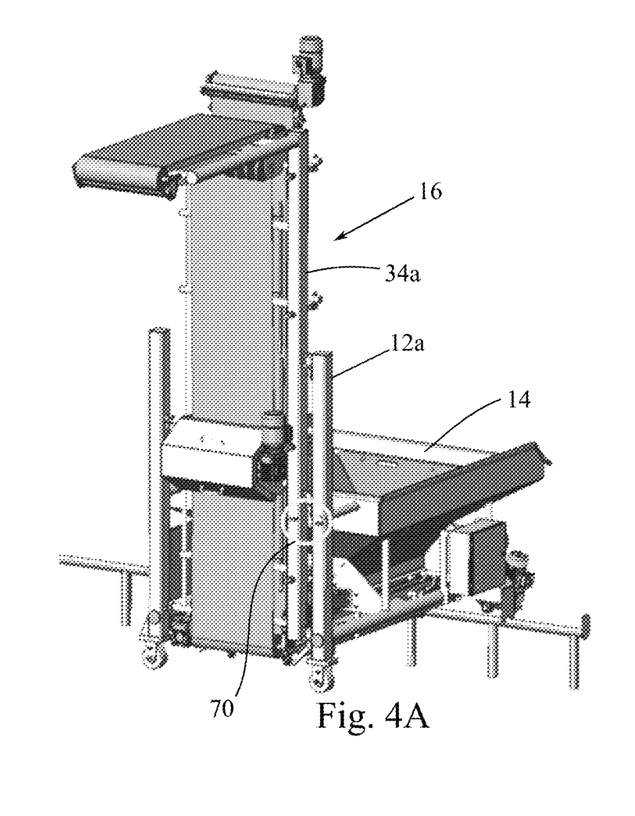
FIGS. 4A-4D show latching assemblies between the base frame and the vertical conveyor assembly for releasably retaining the vertical conveyor assembly in its access position.
Figure 4B:
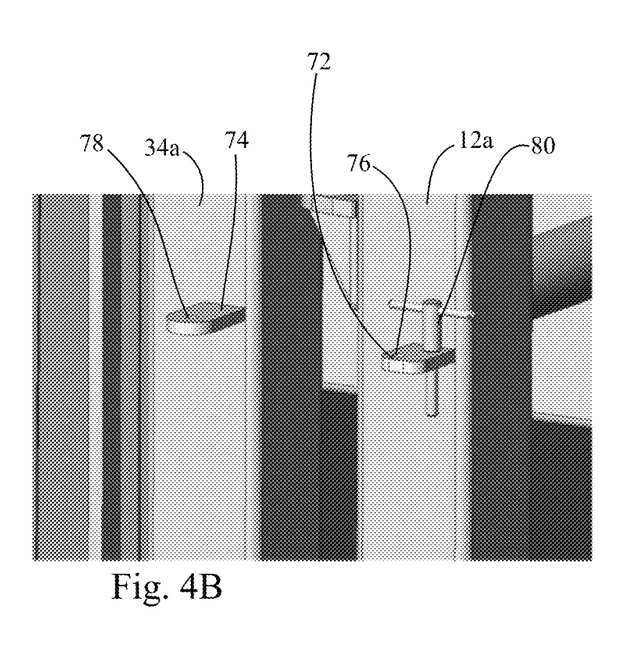
Figure 4C:
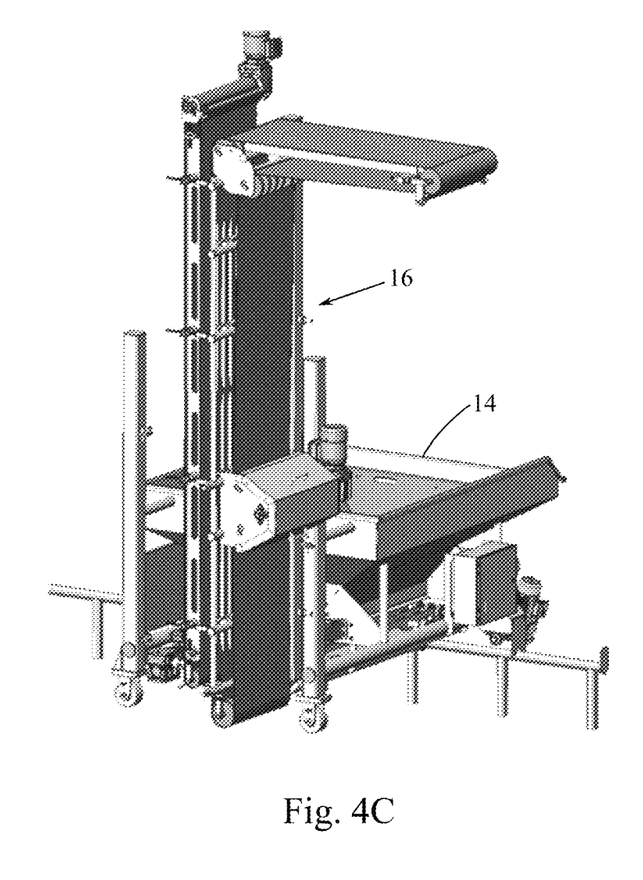
Figure 4D:
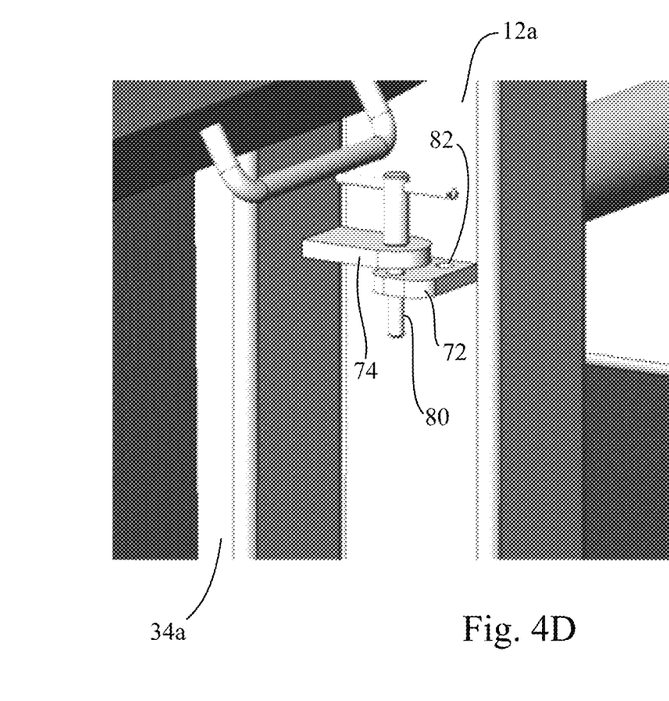
Figure 5A:
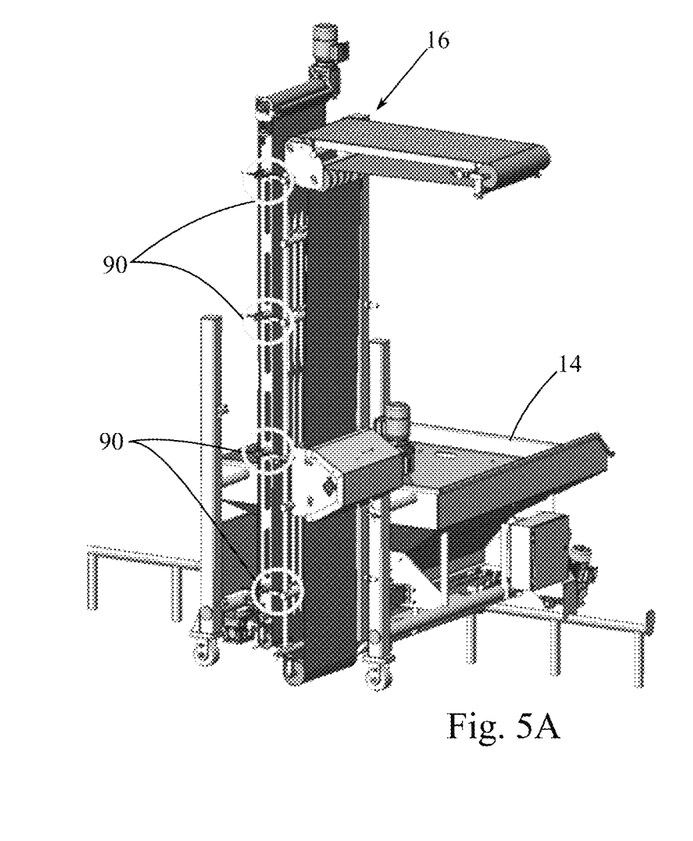
FIGS. 5A-5D show latching assemblies between the two conveyor belt units for releasably retaining the units in operating positions.
Figure 5B:
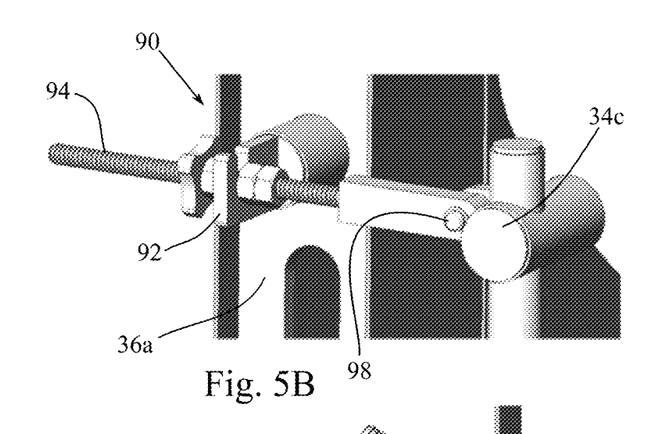
Figure 5C:
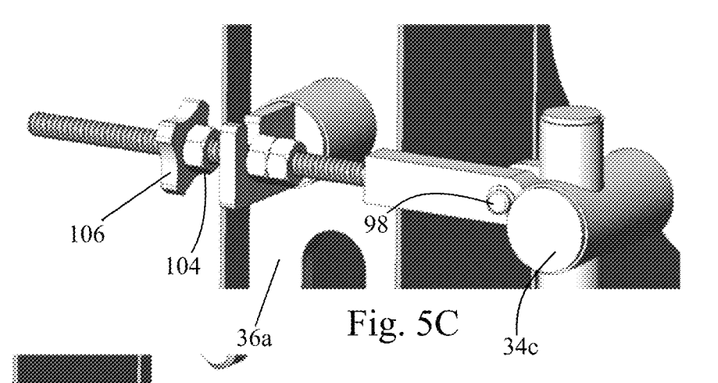
Figure 5D:
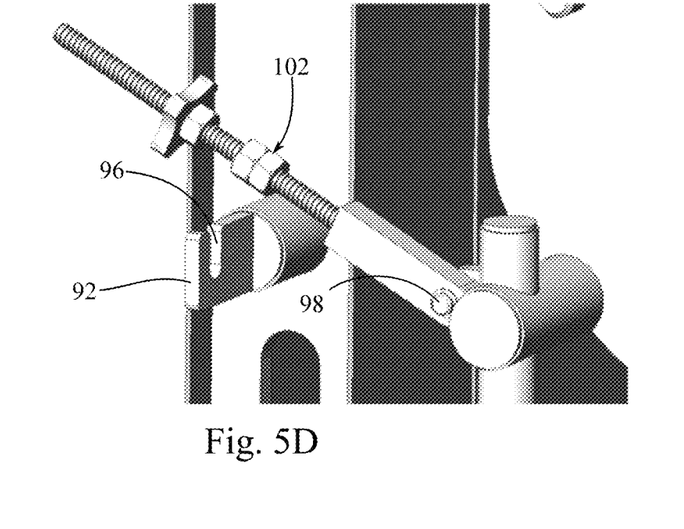

Referring to FIGS. 3A-3C, in order to releasably hold the vertical conveyor assembly 16 in the use position, a pair of latch assemblies 50 are provided. Here, each latch assembly 50 includes a bracket 52 supported on an upright frame member 12*b* and a bracket 54 supported on a distal portion 34*b* of the frame 34. Each bracket 52, 54 includes a respective opening 56, 58, and the openings align with each other such that a latching pin 60 can be passed through the openings when they are aligned. When the latching pin 60 is removed, the brackets 52, 54 can move away from each other per FIG. 3C. The bracket 52 includes a second opening 62 for holding the latching pin 60 while enabling the bracket separation. A stop 64, which may comprise UHMW plastic, is also provided to prevent over travel of the vertical conveyor assembly 16 as it is moved into the use position. Other latch assembly arrangements could be used.

Referring to FIGS. 4A-4D, in order to releasably hold the vertical conveyor assembly 16 in the access position, a latch assembly 70 is provided. Here, the latch assembly includes a bracket 72 carried on frame member 12*a* and a bracket 74 carried on frame member 34*a*, with each bracket including a respective opening 76, 78. When the vertical conveyor assembly 16 is in the use position (FIGS. 4A and 4B) the two brackets 72 and 74 are spaced from each other. When the vertical conveyor assembly is moved to the access position (FIGS. 4C and 4D) the brackets overlap so that the openings 76 and 78 align and a latching pin 80 can be inserted through the aligned openings. Bracket 72 includes a second opening 82 to hold the latching pin 80 when it is not in use. Other latch assembly arrangements could be used, such as powered latches that include one or more solenoid, pneumatic or motor driven latching components.

Latching assemblies 90 are also provided to releasably retain the conveyor unit 22 in its use position relative to conveyor belt unit 20, per FIGS. 5A-5D. Here, each latch assembly 90 includes a bracket 92 carried by an end frame member 36*a* of conveyor belt unit 22, and a latching rod 94 carried by a distal frame portion 34*c* of the conveyor belt unit 20. The bracket 92 includes a slot 96 into which the latching rod 94 is movable, and the latching rod 94 is pivotable about a pin 98 to facilitate its movement. The rod 94 is threaded and carries a set of nuts 102 and a nut 104 with a grip handle 106. The position of the nuts 102 along the length of the rod 94 is adjustable to provide adjustment of the gap size between the two belts when the conveyor belt unit 22 is in the use position. The nuts 102 engage one side of the bracket 92 and the nut 104 is movable into engagement with the opposite side of the bracket for latching (FIG. 5B) and out of engagement with the opposite side of the bracket 92 for release (FIG. 5C) to enable the pivoting separation of the conveyor belt units. Thus, the nuts 102 in combination with the rod thread operate as an adjuster for varying the size of the dough feed gap. Other latch assembly arrangements could be used, as could other adjuster configurations, such as powered adjusters.

Figure 6A:
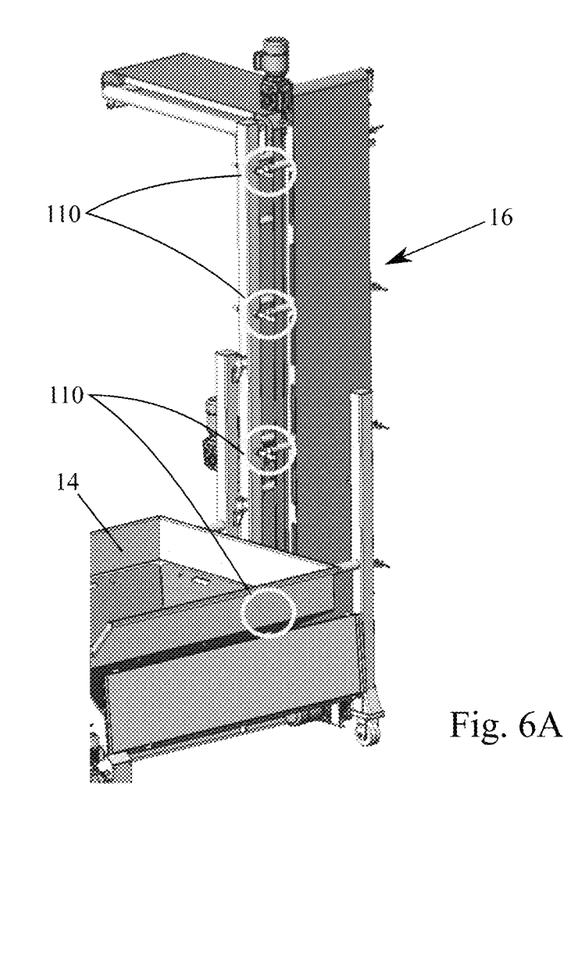
FIGS. 6A-6C show pivot connections between the two conveyor belt units.
Figure 6B:
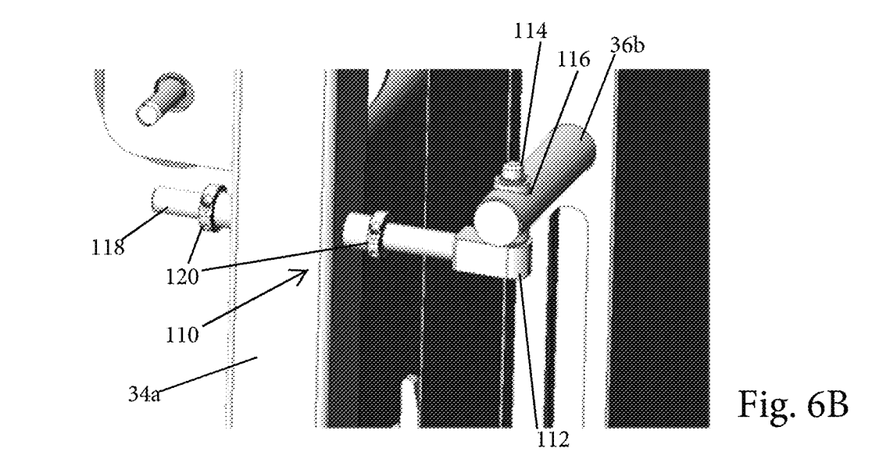
Figure 6C:
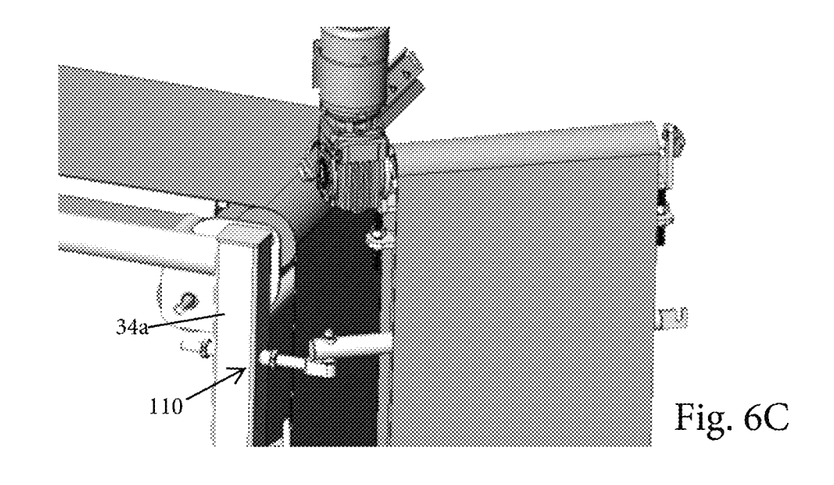

Referring to FIGS. 6A-6C, the pivot connection between the conveyor belt unit 22 and the conveyor belt unit 20 is shown. Here, four pivot connections 110 are provided between the upright frame member 34*a* of unit 20 and frame parts 36*b* of unit 22. In the case of each pivot connection 110, the frame member 34*a* carries a bracket 112 that supports an upright pivot pin 114 and the frame part 36*b* includes a through opening 116 (e.g., with internal bushing) that mounts onto the pivot pin 114. The bracket 112 is supported by a rod 118 that passes through the frame member 34*a*. The rod 118 carries locking collars 120 and 122 that can be fixed in position on the rod 118 (e.g., by set screws or the like). The collars 120 can also be released for movement and repositioning along the rod 118 to vary the length of rod portion 118*a* that carries the bracket 112, again to provide adjustment of the gap size between the two belts when the conveyor belt unit 22 is in the use position. Thus, the collars 120 in combination with the rod 118 operate as an adjuster for varying the size of the dough feed gap. Other styles of pivot connections could be implemented, as could other adjuster configurations, such as powered adjusters.

It is to be clearly understood that the above description is intended by way of illustration and example only, is not intended to be taken by way of limitation, and that other changes and modifications are possible. For example, although the above description contemplates a dough conveyor that runs entirely vertically, the pivot arrangement could be implemented on dough conveyors that are offset from vertical, such as dough conveyors that run upward at an angle that is offset from horizontal by sixty degrees or more. As used herein, a dough conveyor that is offset from horizontal by sixty degrees or more is referred to as a substantially vertical conveyor or a substantially vertical conveyor assembly or an inclined conveyor or an inclined conveyor assembly. A substantially vertical conveyor or conveyor assembly or an inclined conveyor or conveyor assembly that holds product between, and feeds product upward along, a gap between two belts or between one belt and another surface is referred to herein as a substantially vertical gap conveyor or a substantially vertical gap conveyor assembly or an inclined gap conveyor or an inclined gap conveyor assembly.

What is claimed is:

1. A substantially vertical dough conveyor, comprising:
   a base frame;
   a substantially vertical conveyor assembly pivotably connected to the base frame for pivoting movement about a first pivot connection between a use position and an access position relative to the base frame;
   wherein the substantially vertical conveyor assembly includes a first conveyor belt unit and a second conveyor belt unit, wherein the second conveyor belt unit is pivotably connected to the first conveyor unit for pivoting movement about a second pivot connection such that, when the substantially vertical conveyor assembly is in the access position, the second conveyor belt unit is pivotably movable between a first position and a second position relative to the first conveyor belt unit, wherein, in the first position, a belt of the second conveyor belt unit is positioned in opposed relation to a belt of the first conveyor belt unit to define a dough feed gap therebetween, wherein, in the second position, the belt of second conveyor belt unit is pivoted away from the belt of the first conveyor belt unit;
   wherein the first conveyor belt unit and the second conveyor belt unit both pivot about the first pivot connection away from the base frame when the substantially vertical conveyor assembly moves between the use position and the access position relative to the base frame.

2. The substantially vertical dough conveyor of claim 1, wherein:
   the first conveyor belt unit includes a frame having the first pivot connection to the base frame to enable pivot of the substantially vertical conveyor assembly between the use position and the access position;
   the second conveyor belt unit includes a frame having the second pivot connection to the frame of the first conveyor belt unit to enable pivot of the second conveyor belt unit between the first position and the second position.

3. The substantially vertical dough conveyor of claim 2, further comprising:

a first latch assembly between the base frame and the substantially vertical conveyor assembly for releasably retaining the substantially vertical conveyor assembly in the use position;

a second latch assembly between the base frame and the substantially vertical conveyor assembly for releasably retaining the substantially vertical conveyor assembly in the access position.

4. The substantially vertical dough conveyor of claim 3, further comprising:

a third latch assembly between the frame of the first conveyor unit and the frame of the second conveyor unit for releasably retaining the second conveyor unit in the first position.

5. The substantially vertical dough conveyor of claim 4, wherein:

the second pivot connection between the frame of the second conveyor belt unit and the frame of the first conveyor belt unit includes a first adjuster for varying a size of the dough feed gap;

the third latch assembly includes a second adjuster for varying the size of the dough feed gap.

6. The substantially vertical dough conveyor of claim 1, further comprising:

a first latch assembly for releasably retaining the substantially vertical conveyor assembly in the use position;

a second latch assembly for releasably retaining the substantially vertical conveyor assembly in the access position.

7. The substantially vertical dough conveyor of claim 1, further comprising:

a latch assembly for releasably retaining the second conveyor unit in the first position.

8. The substantially vertical dough conveyor of claim 7, wherein:

the second pivot connection between the frame of the second conveyor belt unit and the frame of the first conveyor belt unit includes a first adjuster for varying a size of the dough feed gap;

the latch assembly includes a second adjuster for varying the size of the dough feed gap.

9. The substantially vertical dough conveyor of claim 1, further comprising:

a dough hopper mounted on the base frame; and a horizontal conveyor running below the dough hopper for feeding dough to a lower infeed end of the substantially vertical conveyor assembly.

10. A substantially vertical food product conveyor, comprising:

a substantially vertical gap conveyor assembly having a conveying gap with a lower infeed end and an upper outfeed end;

a feed conveyor for feeding food product to the lower infeed end;

wherein the substantially vertical gap conveyor assembly is mounted for movement between a use position relative to the feed conveyor and an access position relative to the feed conveyor;

wherein the substantially vertical gap conveyor assembly includes a first portion at one side of the conveying gap and a second portion at an opposite side of the conveying gap, wherein the second portion is mounted for movement between a use position relative to the first portion and a cleaning/maintenance position relative to the first portion;

wherein, in the use position of the second portion, the second portion, together with the first portion, defines the conveying gap;

wherein, in the cleaning/maintenance position of the second portion, the second portion is moved to a position that opens at least one side of the conveying gap;

a first latch assembly for releasably retaining the substantially vertical gap conveyor assembly in the use position;

a second latch assembly for releasably retaining the substantially vertical gap conveyor assembly in the access position.

11. The substantially vertical food product conveyor of claim 10, further comprising:

a third latch assembly for releasably retaining the second portion in the use position relative to the first position.

12. The substantially vertical food product conveyor of claim 11, wherein:

a mount connection of the second portion to the first portion includes a first adjuster for varying a size of the conveying gap; and the third latch assembly includes a second adjuster for varying the size of the conveying gap.

13. The substantially vertical food product conveyor of claim 10, wherein the second portion includes a conveyor belt, wherein, in the cleaning/maintenance position of the second portion, the second portion includes a free end by which conveyor belt is removable from the second portion.

14. A substantially vertical food product conveyor, comprising:

a substantially vertical gap conveyor assembly having a conveying gap with a lower infeed end and an upper outfeed end;

a feed conveyor for feeding food product to the lower infeed end;

wherein the substantially vertical gap conveyor assembly is mounted for movement between a use position relative to the feed conveyor and an access position relative to the feed conveyor;

wherein the substantially vertical gap conveyor assembly includes a first portion at one side of the conveying gap and a second portion at an opposite side of the conveying gap, wherein the second portion is mounted for movement between a use position relative to the first portion and a cleaning/maintenance position relative to the first portion;

wherein, in the use position of the second portion, the second portion, together with the first portion, defines the conveying gap;

wherein, in the cleaning/maintenance position of the second portion, the second portion is moved to a position that opens at least one side of the conveying gap;

wherein the feed conveyor runs below a food product hopper from which food product is delivered onto the feed conveyor.

* * * * *